United States Patent
Noma et al.

(10) Patent No.: US 9,316,867 B2
(45) Date of Patent: *Apr. 19, 2016

(54) LIQUID CRYSTAL DISPLAY DEVICE AND METHOD FOR PRODUCING LIQUID CRYSTAL DISPLAY DEVICE

(75) Inventors: Takeshi Noma, Osaka (JP); Youhei Nakanishi, Osaka (JP); Masanobu Mizusaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 157 days.

This patent is subject to a terminal disclaimer.

(21) Appl. No.: 13/984,830

(22) PCT Filed: Feb. 1, 2012

(86) PCT No.: PCT/JP2012/052261
§ 371 (c)(1),
(2), (4) Date: Aug. 9, 2013

(87) PCT Pub. No.: WO2012/108317
PCT Pub. Date: Aug. 16, 2012

(65) Prior Publication Data
US 2014/0285762 A1    Sep. 25, 2014

(30) Foreign Application Priority Data
Feb. 9, 2011 (JP) .................... 2011-026250

(51) Int. Cl.
*G02F 1/1337* (2006.01)
*G02F 1/137* (2006.01)
(Continued)

(52) U.S. Cl.
CPC .......... *G02F 1/133703* (2013.01); *G02F 1/137* (2013.01); *G02F 1/133719* (2013.01);
(Continued)

(58) Field of Classification Search
CPC ................ C09K 2019/0444; C09K 2019/122; G02F 1/133703; G02F 1/133719; G02F 1/137; G02F 2001/133715; G02F 2001/13712; G02F 2001/13775; Y10T 428/1005; Y10T 428/1014; B32B 2457/202

See application file for complete search history.

(56) References Cited

U.S. PATENT DOCUMENTS

| 6,093,344 A | 7/2000 | Park et al. |
| 8,999,465 B2 | 4/2015 | Nakanishi et al. |

(Continued)

FOREIGN PATENT DOCUMENTS

| JP | 6-230394 | 8/1994 |
| JP | 2000-314887 | 11/2000 |

(Continued)

OTHER PUBLICATIONS

International Search Report for PCT/JP2012/052261, mailed Feb. 12, 2012.

(Continued)

*Primary Examiner* — Sophie Hon
(74) *Attorney, Agent, or Firm* — Nixon & Vanderhye P.C.

(57) ABSTRACT

The present invention provides a liquid crystal display device in which a display defect is less likely to occur even when an alignment layer is not formed. The liquid crystal display device of the present invention includes a pair of substrates and a liquid crystal layer held between the pair of substrates, at least one of the substrates including an electrode, and the liquid crystal layer having negative dielectric anisotropy, in which each of the pair of substrates includes a silane coupling layer on a surface of the corresponding substrate, a polymer layer configured to vertically align adjacent liquid crystal molecules is formed on a surface of the silane coupling layer, the polymer layer is formed by the polymerization of at least one monomer contained in a liquid crystal composition, and the at least one monomer contains a compound represented by the chemical formula (1).

9 Claims, 7 Drawing Sheets

(51) Int. Cl.
  *C09K 19/04* (2006.01)
  *C09K 19/12* (2006.01)

(52) U.S. Cl.
  CPC ... *B32B2457/202* (2013.01); *C09K 2019/0444* (2013.01); *C09K 2019/122* (2013.01); *G02F 2001/13712* (2013.01); *G02F 2001/13775* (2013.01); *G02F 2001/133715* (2013.01); *Y10T 428/1005* (2015.01); *Y10T 428/1014* (2015.01)

(56) References Cited

U.S. PATENT DOCUMENTS

| | | |
|---|---|---|
| 2003/0231272 A1 | 12/2003 | Nakamura et al. |
| 2004/0188653 A1 | 9/2004 | Kataoka et al. |
| 2005/0109985 A1 | 5/2005 | Kataoka et al. |
| 2005/0136196 A1 | 6/2005 | Kataoka et al. |
| 2005/0264737 A1 | 12/2005 | Kataoka et al. |
| 2006/0054859 A1 | 3/2006 | Shundo et al. |
| 2006/0066793 A1 | 3/2006 | Ohmuro et al. |
| 2006/0103804 A1 | 5/2006 | Hirosawa |
| 2006/0204680 A1* | 9/2006 | Hattori et al. ............. 428/1.23 |
| 2006/0209240 A1 | 9/2006 | Kataoka et al. |
| 2007/0206129 A1 | 9/2007 | Nakamura et al. |
| 2009/0056853 A1* | 3/2009 | Pai et al. ............. 156/60 |
| 2009/0147200 A1* | 6/2009 | Okuyama et al. ............. 349/127 |
| 2010/0045906 A1 | 2/2010 | Tokuda et al. |
| 2010/0053527 A1* | 3/2010 | Hsieh et al. ............. 349/124 |
| 2010/0221456 A1 | 9/2010 | Kataoka et al. |
| 2012/0050631 A1 | 3/2012 | Ohmuro et al. |
| 2012/0177847 A1 | 7/2012 | Nakamura et al. |
| 2012/0219729 A1 | 8/2012 | Kataoka et al. |
| 2013/0324633 A1 | 12/2013 | Enomoto et al. |
| 2013/0342791 A1 | 12/2013 | Mizusaki et al. |
| 2014/0002782 A1 | 1/2014 | Nakanishi et al. |
| 2014/0139794 A1 | 5/2014 | Ohnishi et al. |
| 2014/0168586 A1 | 6/2014 | Mizusaki et al. |
| 2014/0333879 A1 | 11/2014 | Noma et al. |

FOREIGN PATENT DOCUMENTS

| | | | |
|---|---|---|---|
| JP | 2001-004986 | 1/2001 | |
| JP | 2001004986 A * | 1/2001 | ............ G02F 1/1334 |
| JP | 2004-004329 | 1/2004 | |
| JP | 2004-101782 | 4/2004 | |
| JP | 2004-184846 | 7/2004 | |
| JP | 2004-294648 | 10/2004 | |
| JP | 2004-302061 | 10/2004 | |
| JP | 2005-181582 | 7/2005 | |
| JP | 2005-338613 | 12/2005 | |
| JP | 2006-091545 | 4/2006 | |
| JP | 2006-139047 | 6/2006 | |
| JP | 2006-145992 | 6/2006 | |
| JP | 2010-32860 | 2/2010 | |
| JP | 2010-191450 | 9/2010 | |
| WO | 2008/065818 A1 | 6/2008 | |
| WO | 2012/032857 | 3/2012 | |
| WO | 2012/050178 | 4/2012 | |

OTHER PUBLICATIONS

International Search Report for PCT/JP2012/055960, mailed Apr. 3, 2012.
Office Action mailed Jan. 15, 2015 in U.S. Appl. No. 14/003,976.
International Search Report for PCT/JP2012/055942, mailed Jun. 12, 2012.
Office Action mailed Dec. 4, 2014 in U.S. Appl. No. 14/003,470.
Office Action mailed Jun. 15, 2015 in U.S. Appl. No. 14/003,470; Nakanishi.

* cited by examiner

LIQUID CRYSTAL DISPLAY DEVICE AND METHOD FOR PRODUCING LIQUID CRYSTAL DISPLAY DEVICE

This application is the U.S. national phase of International Application No. PCT/JP2012/052261 filed 1 Feb. 2012 which designated the U.S. and claims priority to JP Patent Application No. 2011-026250 filed 9 Feb. 2011, the entire contents of each of which are hereby incorporated by reference.

TECHNICAL FIELD

The present invention relates to a liquid crystal display device and a method for producing a liquid crystal display device, and, more particularly, to a liquid crystal display device that controls alignment properties of liquid crystal molecules with a polymer layer formed by the polymerization of a monomer contained in a liquid crystal composition without the formation of an existing alignment layer, and a method for producing the liquid crystal display device.

BACKGROUND ART

Liquid crystal display devices have been widely used as television sets, personal computers, personal digital assistants (PDAs), and so forth because of their thinness, lightness, and low power consumption. In particular, there have recently been rapid advances in an increase in the size of liquid crystal display devices as typified by liquid crystal display devices for television sets. In the case of increasing the size, a multi-domain vertical alignment (MVA) mode is suitably used because even a large area can be produced in high yield and a wide viewing angle is provided. In the multi-domain vertical alignment mode, liquid crystal molecules are aligned perpendicularly to a substrate surface when a voltage is applied to a liquid crystal layer. It is thus possible to achieve high contrast, compared with a conventional twisted nematic (TN) mode.

In MVA mode, an alignment layer does not regulate the tilting direction of liquid crystal molecules. The tilting direction of liquid crystal molecules is determined by the effect of a protrusion (rib) composed of an insulating material, so there is no need to perform an alignment treatment step for the alignment layer. That is, static electricity and dust, which are generated by rubbing or the like, are not generated, thereby eliminating a cleaning step or the like after alignment treatment. Furthermore, the degree of nonuniformity of the initial tilt of liquid crystal molecules is low, which is effective in process simplification, yield improvement, and cost reduction.

In MVA mode, while there is no need for alignment treatment, it is necessary to form an undercoat layer corresponding to an alignment layer. The elimination of the undercoat layer is more preferred in light of the unevenness of the undercoat layer, the effect of contamination with foreign matter on the alignment of liquid crystal molecules, and an increase in the number of production steps and capital investment for the formation of the undercoat layer.

Meanwhile, a technique for imparting a pretilt angle by filling a liquid crystal composition containing a liquid crystal and a polymerizable component, such as a monomer or an oligomer (hereinafter, referred to as a monomer or the like), between substrates, and polymerizing the monomer or the like to form a polymer layer with liquid crystal molecules tilted by the application of a voltage between the substrates has recently been receiving attention (for example, see PTL 1). The liquid crystal exhibits a predetermined pretilt angle by the effect of the polymer layer even when the application of the voltage is stopped. Thus, the tilted direction of liquid crystal molecules is maintained without an alignment layer. The polymerization of the monomer or the like is performed by heat or irradiation with light (for example, ultraviolet rays).

CITATION LIST

Patent Literature

PTL 1: Japanese Unexamined Patent Application Publication No. 2010-191450

SUMMARY OF INVENTION

Technical Problem

However, the inventors have conducted studies and have found that even if a polymer layer is formed by filling a liquid crystal composition containing a liquid crystal material, a monomer, a polymerization initiator, and so forth between a pair of substrates and performing a polymerization reaction under predetermined conditions, insufficient controllability of the alignment of liquid crystal molecules is provided, depending on materials used and production conditions, thereby failing to provide satisfactory display, in some cases. Specifically, the V-T characteristics can exhibit hysteresis, thereby causing alignment defects to lead to bright spots and bright lines in black display.

FIG. 20 illustrates a photograph of a black screen of a liquid crystal display device formed by a conventional technique for forming a polymer layer with lauryl acrylate serving as a monomeric material. A compound represented by the chemical formula (3):

[Chem. 1]

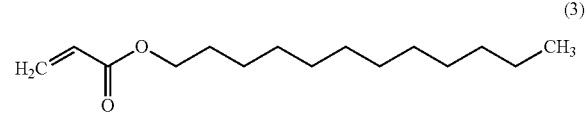

(3)

is lauryl acrylate.

The black screen of the liquid crystal display panel in FIG. 20 is observed with a polarizing microscope that is set in such a manner that the polarization axes intersect to each other at 90° without attaching a polarizer. FIG. 20 reveals that in an example using lauryl acrylate, bright spots and bright lines are formed in black display and that display defects occur. This indicates that although normal irradiation (for example, irradiation at normal temperature using a fluorescent tube, such as a black light) is performed with lauryl acrylate to form passable vertical alignment of liquid crystal molecules, vertical alignment is not sufficiently provided unless an alignment layer is formed as an undercoat layer like the related art. As described above, there is a room for improvement in a method for forming a polymer layer by filling a liquid crystal composition containing a liquid crystal material, a monomer, a polymerization initiator, and so forth between a pair of substrates and performing a polymerization reaction under predetermined conditions.

The present invention was accomplished in light of the foregoing circumstances. It is an object of the present invention to provide a liquid crystal display device that is less likely to cause a display defect even without the formation of an alignment layer.

Solution to Problem

The inventors have extensively conducted studies on a method for strongly regulating the vertical alignment of liquid crystal molecules even without the formation of an alignment layer. The inventors have focused attention on the modification of surface properties of a substrate. In particular, the inventors have focused attention on a method for using a silane coupling agent. Specifically, the inventors have found that when a silane coupling agent that adheres strongly to a polymerizable group of the monomeric material is applied on a substrate surface before a step of polymerizing a monomer incorporated in a liquid crystal composition, monomer molecules adhere to the molecular structure of an end of the silane coupling compound, and the monomer molecules are aligned perpendicularly to the substrate surface by, for example, annealing. The inventors have also found that when a polymer layer is formed by the polymerization of the monomer molecules with the monomer molecules vertically aligned, good vertical alignment properties for liquid crystal molecules is provided.

The inventors have also focused attention on the type of monomer incorporated into a liquid crystal composition and have found that when a monofunctional monomer having a biphenyl skeleton which serves as a monomer and which strongly interacts with liquid crystal molecules is used in combination with the foregoing silane coupling agent, substantially no bright line occurs on black display, i.e., satisfactory display is provided. The inventors have conceived that the findings completely solve the foregoing problems. The findings have led to the completion of the present invention.

That is, according to an aspect of the present invention, a liquid crystal display device includes a pair of substrates and a liquid crystal layer held between the pair of substrates, at least one of the substrates including an electrode, and the liquid crystal layer having negative dielectric anisotropy, in which each of the pair of substrates includes a silane coupling layer on a surface of the corresponding substrate, a polymer layer configured to vertically align adjacent liquid crystal molecules is formed on a surface of the silane coupling layer, the polymer layer is formed by the polymerization of at least one monomer contained in a liquid crystal composition, and the at least one monomer contains a monofunctional monomer represented by the chemical formula (1):

[Chem. 2]

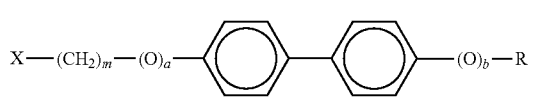

(1)

(wherein in the formula, X represents an acrylate group, a methacrylate group, an ethacrylate group, a vinyl group, or an allyl group; m represents an integer of 0 to 4; a represents 0 or 1; b represents 0 or 1; and R represents an alkyl group having 1 to 20 carbon atoms). The liquid crystal display device of the present invention will be described in detail below.

The pair of substrates included in the liquid crystal display device of the present invention is substrates to held the liquid crystal layer and is produced by, for example, using insulative substrates as a base composed of, for example, glass or a resin, and mounting wiring, an electrode, a color filter, and so forth on the insulative substrates. In the present invention, at least one of the pair of substrates includes the electrode. It is thus possible to control whether a voltage is applied to the liquid crystal layer or not.

The liquid crystal layer has negative dielectric anisotropy. Thus, liquid crystal molecules in the liquid crystal layer are aligned to a direction perpendicular to a direction of electric lines of force when a voltage equal to or higher than a threshold value is applied. For example, in the case where a substrate surface has vertical alignment properties that allow liquid crystal molecules adjacent to the substrate surface to be initially tilted in the vertical direction, the present invention is used in a vertical alignment (VA) mode.

In the present invention, substantially no alignment layer is included in any of the pair of substrates. In a common liquid crystal display device, an alignment layer is formed by directly applying an alignment layer material on a substrate surface constituting a display area (for example, the application of polyimide, polyamic acid, or the like) or by deposition (for example, oblique deposition of silicon (Si)). The display area indicates an area that constitutes an image recognized by an observer. A peripheral area, such as a terminal portion, is not included. The alignment layer is not limited to an alignment layer that has been subjected to alignment treatment as long as an existing alignment layer material, such as polyimide, is applied. Examples of the alignment layer that has been subjected to alignment treatment include alignment layers that subjected to rubbing treatment and photoalignment treatment. For example, in the case where an alignment control structure is provided as in an MVA mode or a PVA mode described below, it is possible to control the tilt of liquid crystal molecules without such an alignment treatment. A conventional alignment layer is patterned and formed in part of a display area, in some cases.

In the present invention, each of the pair of substrates includes the silane coupling layer on the surface thereof. The silane coupling layer is a layer composed of a component containing a silane coupling compound. The silane coupling compound indicates a compound containing silicon (Si) and an organic functional group (Y). Examples of the organic functional group (Y) include an epoxy group, a methacryloxy group, an acryloxy group, an amino group, a ureido group, a chloropropyl group, a mercapto group, and an isocyanate group. The silane coupling compound adheres strongly to a polymerizable group of a monomeric material. Thus, when the silane coupling compound is applied to the substrate and subjected to annealing or the like, it is possible to provide the effect of modifying the properties of the surface of the substrate.

The polymer layer configured to vertically align adjacent liquid crystal molecules is formed on a surface of the silane coupling layer. The polymer layer is formed by the polymerization of at least one monomer contained in the liquid crystal composition. The at least one monomer contains a monofunctional monomer represented by the foregoing chemical formula (1). The effect of the silane coupling layer imparts high alignment regulating force to the polymer layer. It is thus possible to control the vertical alignment properties of adjacent liquid crystal molecules even without an alignment layer. The polymer layer used here is distinguished from the concept of the foregoing alignment layer.

The compound represented by the chemical formula (1) has a biphenyl group as a skeleton and thus strongly interacts with the liquid crystal. Two bonded benzene rings are bound together at the 1-position and the 1'-position thereof and have a linear structure. No bending portion is present from a functional group located at its end to biphenyl, thereby providing a stable linear structure. It is thus possible to align adjacent liquid crystal molecules by a stable vertical alignment regulating force.

The polymer layer that imparts an excellent vertical alignment regulating force is formed on a surface in contact with the liquid crystal layer, thereby resulting in the liquid crystal display device which is less likely to cause a bright spot or a bright line and which has satisfactory display quality.

The structure of the liquid crystal display device of the present invention is not particularly limited to an additional constituent as long as the foregoing constituents are indispensably included in the structure.

The liquid crystal composition according to the present invention may further contain a compound serving as a monomeric material other than the monofunctional monomer represented by the chemical formula (1). The proportion (weight percent) of the monofunctional monomer represented by the chemical formula (1) in the liquid crystal composition is preferably 0.3% by weight. The liquid crystal composition may contain a polymerization initiator. The polymerization initiator allows polymerization to proceed readily.

The at least one monomer preferably contains a bifunctional monomer represented by the chemical formula (2):
[Chem. 3]

(2)

(wherein in the formula, $P^1$ and $P^2$ are the same or different and each represent an acrylate group, a methacrylate group, a vinyl group, a vinyloxy group, or an epoxy group; $A^1$ and $A^2$ are the same or different and each represent a functional group selected from the group consisting of a 1,4-phenylene group, a naphthalene-2,6-diyl group, and a phenanthrene-2,7-diyl group, a hydrogen group may be replaced with a halogen group, a methyl group, an ethyl group, or a propyl group, and carbon atoms of the benzene ring may be replaced to form a heterocyclic ring; $Z^1$ represents COO, OCO, O, or direct bonding between $A^1$ and $A^2$ or between $A^2$ and $A^2$; and n represents 0, 1, or 2).

The addition of the bifunctional monomer improves the crosslink density of the polymer layer which is formed from the monofunctional monomer and which is located at boundaries of the substrates after the polymerization, thereby resulting in the polymer layer having a stronger vertical alignment regulating force.

The at least one monomer preferably contains a monomer that generates a radical by irradiation with light having a wavelength of 330 nm or more. A high-pressure mercury lamp, which is used as a common light source, often exhibits a small emission-line peak at 313 nm and emits light having high luminous intensity at 330 nm or more. Thus, in order to sufficiently photopolymerize a monomer having an absorption wavelength of less than 330 nm, it is necessary to perform irradiation with ultraviolet light for a long time or multiple irradiation with ultraviolet light. However, the irradiation with ultraviolet light for a long time can allow the degradation of a component member (for example, the liquid crystal layer) of the liquid crystal display device to proceed, thereby causing a defect, such as image persistence. In the case where irradiation with ultraviolet light is performed for a short time in order to stop the progress of the degradation of the liquid crystal layer, the monomer can be insufficiently polymerized to form an incomplete polymer layer, thereby causing a defect, such as image persistence. Thus, the use of the monomer that absorbs light having a wavelength of 330 nm or more enhances light use efficiency and results in the formation of a stable polymer layer even when single irradiation is performed for a short time. Even if the monofunctional monomer represented by the chemical formula (1) does not absorb light having a wavelength of 330 nm or more, in the case where another monomer generates a radical by light having a wavelength of 330 nm, the resulting radical attacks a polymerizable group of the monofunctional monomer, thereby allowing the polymerization of the monofunctional monomer to proceed without irradiation with light having a wavelength of less than 330 nm.

The inventors have found a specific method for producing such a liquid crystal display device as described below.

According to another aspect of the present invention, a method for producing a liquid crystal display device that includes a pair of substrates and a liquid crystal layer held between the pair of substrates, at least one of the substrates including an electrode, and the liquid crystal layer having negative dielectric anisotropy, includes, in sequence a step of applying a silane coupling agent to a surface of each of the pair of substrates, a step of filling a liquid crystal composition between the pair of substrates, the liquid crystal composition containing a liquid crystal molecules and at least one monomer, a step of annealing the pair of substrates and the liquid crystal composition, and a step of irradiating the liquid crystal composition with light, in which the at least one monomer is represented by the foregoing chemical formula (1).

As described above, the silane coupling compound adheres strongly to the polymerizable group of the monomeric material. Thus, in the case where a solvent containing the silane coupling compound is applied to a substrate and subjected to annealing, when the monomer is then polymerized to form the polymer layer, the surface properties of the substrate surface are changed to exhibit high vertical alignment properties. The annealing step has the effect of allowing the long axis of the monomer to be directed to a direction perpendicular to the substrate surface.

FIG. 21 is a flow chart illustrating an example of a conventional production process of a liquid crystal display device. FIG. 22 is a flow chart illustrating an example of the production process of a liquid crystal display device of the present invention. As illustrated in FIG. 21, in the related art, an alignment layer material is applied after the cleaning of a substrate. After annealing, a bonding step, such as the printing of a sealing material, is performed. Alternatively, after the annealing of the alignment layer, the alignment layer can be subjected to rubbing and cleaning. In contrast, in the present invention, after the cleaning of a substrate, the printing of a sealing material is performed without performing a step of forming an alignment layer, as illustrated in FIG. 22. An example of a method of printing a sealing material is a method in which after the application of a material, curing is performed by UV irradiation and/or heat. Conventionally, a liquid crystal is dropped, substrates are bonded together, and then a step of bonding a polarizer is performed. In the present invention, a liquid crystal is dropped, substrates are bonded together, and then a polymerization step of forming a polymer layer by, for example, UV irradiation is performed. Examples of a method for filling a liquid crystal include a vacuum filling method in addition to a dispenser method. In such a case, after annealing the sealing material, the vacuum filling of a liquid crystal is performed. An example of a method for maintaining the thickness of the liquid crystal layer is a method in which spacers are used. Examples thereof include a method in which columnar photo spacers are formed by patterning and a method in which spherical spacers are dispersed.

In the step of applying a silane coupling agent, the concentration of the silane coupling compound in the silane coupling agent is preferably in the range of 0.001% to 1.0% by weight with respect to the silane coupling agent as a whole. It is thus possible to easily apply the silane coupling agent without degrading the function of the silane coupling layer. When the concentration of the silane coupling compound is less than 0.001% by weight, vertical alignment may not be achieved or high vertical alignment properties for liquid crystal molecules may not be provided. When the concentration of the silane coupling compound is more than 1.0% by weight, a liquid crystal panel may have low reliability, for example, a reduction in the ability to hold a charge. As the silane coupling agent, an aqueous solution prepared by diluting the silane coupling compound with water is preferably used.

The liquid crystal composition preferably contains a polymerization initiator. In this case, even if the monomer itself does not have photopolymerizability, a photopolymerization reaction proceeds readily. Examples of the type of polymerization initiator include cleavage-type polymerization initiators, such as Irgacure 651, and hydrogen abstraction-type polymerization initiators, such as benzophenone.

The at least one monomer is preferably a monomer that generates a radical by irradiation with light having a wavelength of 330 nm or more. As described above, it is thus possible to allow a polymerization reaction to proceed in a short time without degradation of the members due to ultraviolet rays. In this case, a photopolymerization initiator may not be necessarily added.

Advantageous Effects of Invention

In a liquid crystal display device of the present invention, a polymer layer having a vertical alignment regulating force for liquid crystal molecules is formed even without the formation of an alignment layer, thereby inhibiting the occurrence of a bright spot or bright line in black display and providing satisfactory display quality.

DESCRIPTION OF EMBODIMENTS

Figure 1:
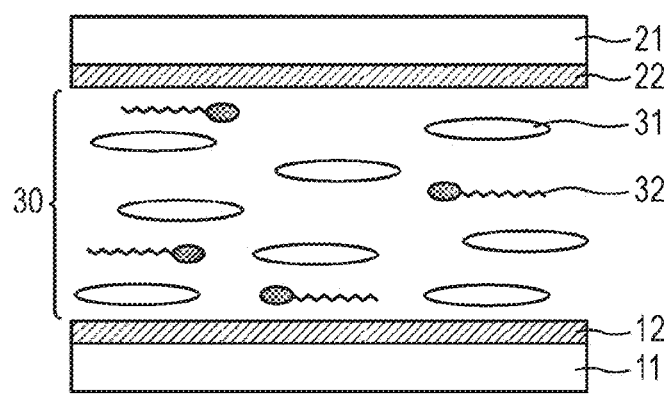
FIG. 1 is a schematic cross-sectional view illustrating a stage in the production process of a liquid crystal display device according to a first embodiment and illustrates a state after a step of filling a liquid crystal.
Figure 2:
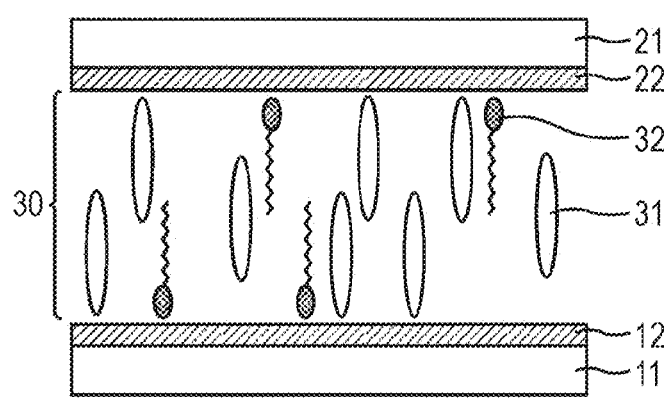
FIG. 2 is a schematic cross-sectional view illustrating a stage in the production process of the liquid crystal display device according to the first embodiment and illustrates a state after an annealing step.
Figure 3:
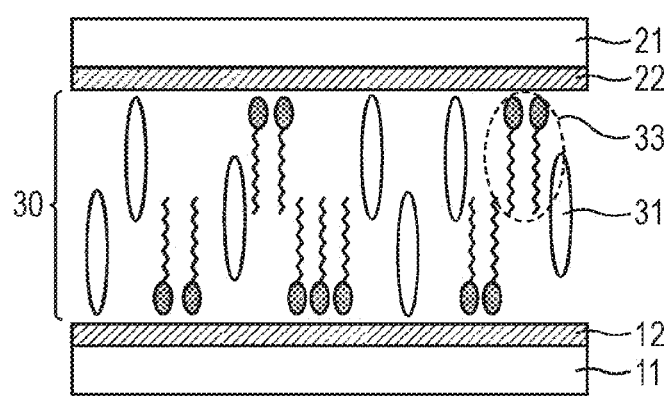
FIG. 3 is a schematic cross-sectional view illustrating a stage in the production process of the liquid crystal display device according to the first embodiment and illustrates a state after an ultraviolet irradiation step.

While the present invention will be described in more detail by embodiments with reference to the drawings, the present invention is not limited to these embodiments.
First Embodiment
FIGS. 1 to 3 are schematic cross-sectional views illustrating stages in the production process of a liquid crystal display device according to a first embodiment. FIG. 1 illustrates a state after a step of filling a liquid crystal. FIG. 2 illustrates a state after an annealing step. FIG. 3 illustrates a state after ultraviolet irradiation step. As illustrated in FIG. 1, in the case where the liquid crystal display device according to the first embodiment is produced, first, a liquid crystal cell including a first substrate 11, a second substrate 21, and a liquid crystal layer 30 held between a pair of substrates, i.e., the first substrate 11 and the second substrate 21, is prepared.

The first substrate 11 includes an insulative transparent substrate composed of glass or the like and conductive members, such as wiring, a first electrode, and thin film transistors (TFTs) formed on the transparent substrate. The first electrode is provided to apply a voltage to the liquid crystal layer and partially constitutes a surface of the first substrate 11. Substantially no alignment layer is formed on the first substrate 11. A silane coupling layer 12 is formed on a surface of the first substrate 11, i.e., a surface of the first electrode.

The second substrate 21 includes an insulative transparent substrate composed of glass or the like, color filters, a black matrix, and a second electrode. The types of color, the numbers, and the order of arrangement of the color filters are not particularly limited. The second electrode is provided to apply a voltage to the liquid crystal layer and partially constitutes a surface of the second substrate 12. Substantially no alignment layer is formed on the second substrate 20. A silane coupling layer 22 is formed on a surface of the second substrate 21, i.e., a surface of the second electrode.

The second electrode may not be arranged on the side of the second substrate 21 but may be arranged on the side of the first substrate 11, depending on the alignment mode of the liquid crystal. Each of the first electrode and the second electrode may be formed of a flat plate without a slit or with slits in a plurality of regions.

The liquid crystal layer 30 is composed of a liquid crystal material with negative dielectric anisotropy. In the first embodiment, as described below, a polymer layer having a strong alignment regulating force that allows the initial tilt of liquid crystal molecules to be directed to a direction perpendicular to a substrate surface is obtained.

With respect to a procedure of the production process, a series of steps described below is performed: A substrate provided with an electrode and so forth is prepared. Surfaces of the substrate are cleaned. As a step of forming a silane coupling layer, a silane coupling agent is spin-coated on a surface of the substrate. After the silane coupling agent is subjected to showering, an air knife step of removing water is performed. Examples of a silane coupling compound contained in the silane coupling agent include 3-glycidoxypropylmethyldimethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-ureidopropyltriethoxysilane, 3-chloropropyltrimethoxysilane, 3-mercaptopropylmethyldimethoxysilane, and 3-isocyanatopropyltriethoxysilane. They may be used as a mixture thereof.

As a silane coupling agent to be applied to the surfaces of the substrates 11 and 21, a dilute aqueous solution of a 0.001% to 1.0% by weight silane coupling compound is preferably used. Rinsing (cleaning with deionized water) may not be performed after treatment with the silane coupling agent.

Subsequently, a sealing agent is applied to a predetermined position on the first substrate 11. Beads are dispersed on the second substrate 21. The first substrate 11 and the second substrate 21 are bonded together. A liquid crystal composition containing liquid crystal molecules 31 with negative dielectric anisotropy is filled between the substrates 11 and 21 to form the liquid crystal layer 30. As the sealing agent, any of a thermosetting agent, an UV-curable agent, and an agent having both the properties may be used.

As illustrated in FIG. 1, a monofunctional monomer 32 is contained in the liquid crystal layer 30 in addition to the liquid crystal molecules 31. The monofunctional monomer 32 used in the first embodiment is a compound represented by the chemical formula (1):

[Chem. 4]

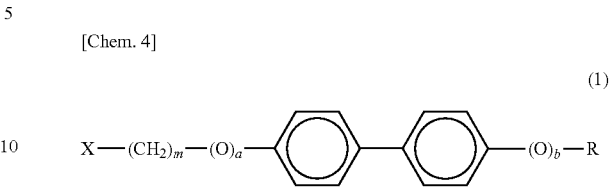

(1)

(wherein in the formula, X represents an acrylate group, a methacrylate group, an ethacrylate group, a vinyl group, or an allyl group; m represents an integer of 0 to 4; a represents 0 or 1; b represents 0 or 1; and R represents an alkyl group having 1 to 20 carbon atoms).

After the liquid crystal composition containing the monofunctional monomer 32 is filled between the substrates 11 and 21, annealing treatment is performed at a predetermined temperature for a predetermined period of time, as illustrated in FIG. 2. By performing the annealing step, the monofunctional monomer interacts with the silane coupling layer and the liquid crystal molecules and is arranged in such a manner that its longitudinal direction is a direction perpendicular to the substrate surfaces. Subsequently, the monofunctional monomer 32 is polymerized by irradiation with predetermined light from a direction normal to the substrate surfaces, thereby forming polymer layers 33 extending to the direction perpendicular to the substrate surfaces, as illustrated in FIG. 3. The liquid crystal composition preferably contains a photopolymerization initiator and a photosensitizer, as needed. In the annealing step, a temperature equal to or higher than a temperature at which the liquid crystal phase is transformed to an isotropic phase is preferred. Specifically, 100° C. or higher and 140° C. or lower is preferred. The period of time is preferably 1 minute or more and 60 minutes or less. Examples of light for polymerization include, but are not particularly limited to, ultraviolet light and visible light.

The polymerization of the monomer is initiated in the light irradiation step to form the polymer layers 33 on the surfaces of the silane coupling layers 12 and 22 provided on the first electrode and the second electrode. In the first embodiment, the vertical alignment regulating force is provided in the annealing step of heating the entire liquid crystal cell and the light irradiation step of irradiating the liquid crystal layer with ultraviolet rays (UV). The polymerization reaction of the monofunctional monomer 32 is initiated by, for example, irradiating the monomer with light or by the effect of an active species formed by irradiating the polymerization initiator with light.

In the liquid crystal display device according to the first embodiment, component members are disassembled. The polymer layers are sampled and subjected to chemical analyses, such as nuclear magnetic resonance (NMR) spectrometry, Fourier transform infrared spectroscopy (FTIR), and mass spectrometry (MS), to analyze the component of the polymer layers, the monomer component present in the polymer layers, the component of the polymerization initiator contained in the liquid crystal layer, the amount of the polymerization initiator contained in the liquid crystal layer, the component of the silane coupling compound in the silane coupling layers, the concentration of the silane coupling compound in the silane coupling layers, and so forth.

EXAMPLE 1

An example of the actual production of a liquid crystal display device according to the first embodiment will be described below.

A pair of substrates including a first substrate and a second substrate was prepared. A dilute aqueous solution containing a silane coupling compound was applied onto a surface of each of the substrates. The concentration of the silane coupling compound in the dilute aqueous solution was in the range of 0.001% to 1.0% by weight with respect to a silane coupling agent as a whole. A rinsing (cleaning with deionized water) step after the treatment with the silane coupling agent was not performed.

Subsequently, a sealing agent was applied to a predetermined position of the first substrate. Beads were dispersed on the second substrate. The first substrate and the second substrate were bonded together. A liquid crystal material having negative dielectric anisotropy was filled between the pair of substrates to form a liquid crystal layer. A monofunctional monomer represented by the following chemical formula (4):

[Chem. 5]

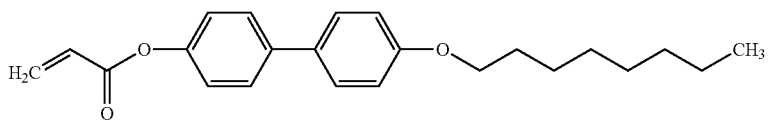

(4)

was introduced into the liquid crystal layer in a concentration of 4.5% by weight with respect to the overall liquid crystal composition.

The compound represented by the chemical formula (4) is 4-acryloxy-4'-octylbiphenyl. A functional group, an alkyl group, or an alkoxy group is bound to the 4-4' positions of the biphenyl. The functional group and the biphenyl group are directly bound together. It is thus possible to form the polymer layers having a high alignment regulating force, the polymer layers being capable of aligning the liquid crystal molecules in the direction perpendicular to the substrate surfaces.

In addition, the monofunctional monomer represented by the chemical formula (4) has a biphenyl group. It is thus possible to form the polymer layers having a high alignment regulating force, the polymer layers being capable of aligning the liquid crystal molecules in such a manner that long axes of the liquid crystal molecules are aligned in the direction along the side chain of the polymer.

Furthermore, in the monofunctional monomer represented by the chemical formula (4), a portion extending from the biphenyl group to the alkyl chain end has a linear structure. It is thus possible to form the polymer layers having a stable alignment regulating force, the polymer layers being capable of aligning the liquid crystal molecules.

After the filling of the liquid crystal, annealing treatment was performed at 130° C. for 1 hour. Subsequently, polymerization was performed by irradiation with unpolarized UV light (0.33 mW/cm$^2$) from the normal direction for 10 minutes (0.2 J/cm$^2$). As electrodes, flat-shaped electrodes without a slit were used.

Second Embodiment

A second embodiment differs from the first embodiment in that as the monomeric material contained in the liquid crystal composition, a polyfunctional monomer is used together with the monofunctional monomer. The rest of the second embodiment is the same as in the first embodiment.

Figure 4:
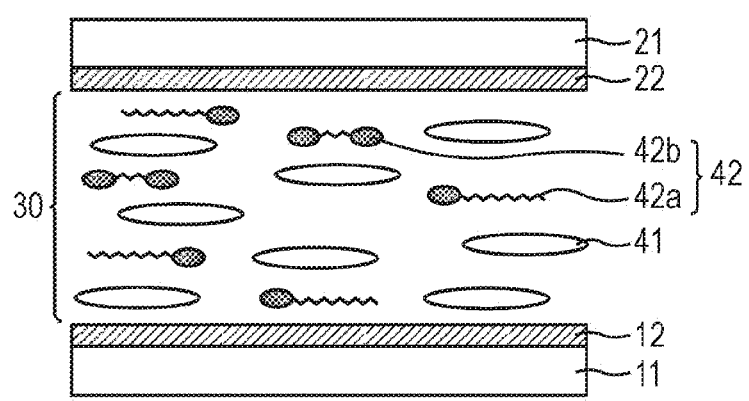
FIG. 4 is a schematic cross-sectional view illustrating a stage in the production process of a liquid crystal display device according to a second embodiment and illustrates a state after a step of filling a liquid crystal.
Figure 5:
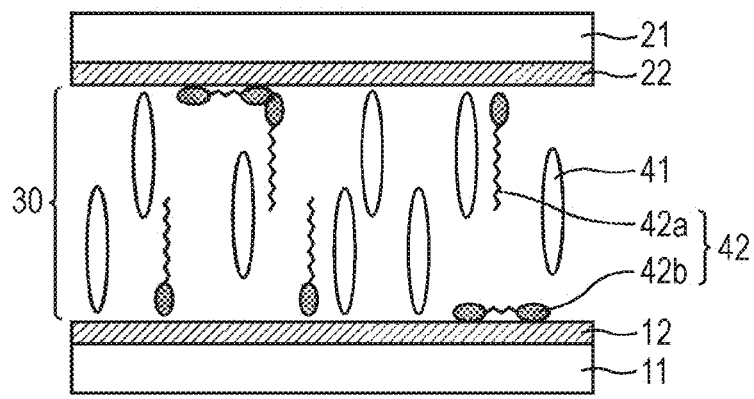
FIG. 5 is a schematic cross-sectional view illustrating a stage in the production process of the liquid crystal display device according to the second embodiment and illustrates a state after an annealing step.
Figure 6:
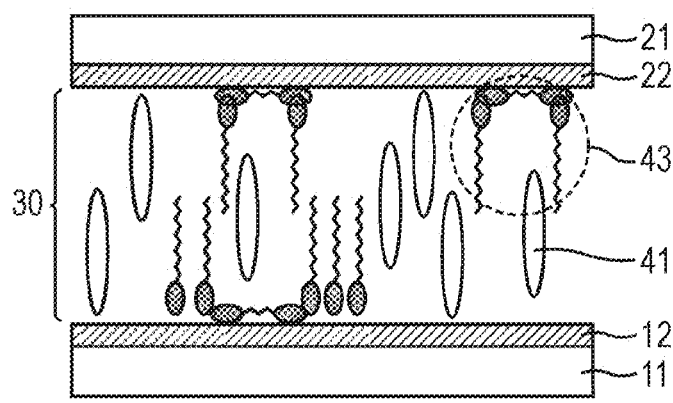
FIG. 6 is a schematic cross-sectional view illustrating a stage in the production process of the liquid crystal display device according to the second embodiment and illustrates a state after an ultraviolet irradiation step.

FIGS. 4 to 6 are schematic cross-sectional views illustrating stages in the production process of a liquid crystal display device according to the second embodiment. FIG. 4 illustrates a state after a step of filling a liquid crystal. FIG. 5 illustrates a state after an annealing step. FIG. 6 illustrates a state after an ultraviolet irradiation step. In the case where the liquid crystal display device according to the second embodiment is produced, a liquid crystal cell is prepared, the liquid crystal cell including the first substrate 11, the second substrate 21, and the liquid crystal layer 30 held between the pair of substrates including the first substrate 11 and the second substrate 21. The first substrate 11 includes an insulative transparent substrate composed of, for example, glass. The silane coupling layer 12 is formed on a surface of the first substrate 11. The second substrate 21 an insulative transparent substrate composed of, for example, glass. The silane coupling layer 22 is formed on a surface of the second substrate 21.

A monofunctional monomer 42a used in the second embodiment is represented by the following chemical formula (1):

[Chem. 6]

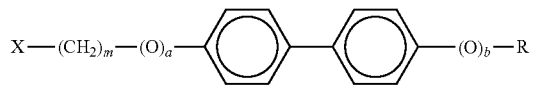

(1)

(wherein in the formula, X represents an acrylate group, a methacrylate group, an ethacrylate group, a vinyl group, or an allyl group; m represents an integer of 0 to 4; a represents 0 or 1; b represents 0 or 1; and R represents an alkyl group having 1 to 20 carbon atoms).

A bifunctional monomer 42b used in the second embodiment is represented by the following chemical formula (2):
[Chem. 7]

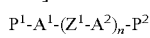

(2)

(wherein in the formula, P$^1$ and P$^2$ are the same or different and each represent an acrylate group, a methacrylate group, a vinyl group, a vinyloxy group, or an epoxy group; A$^1$ and A$^2$ are the same or different and each represent a functional group selected from the group consisting of a 1,4-phenylene group, a naphthalene-2,6-diyl group, and a phenanthrene-2,7-diyl group, a hydrogen group may be replaced with a halogen group, a methyl group, an ethyl group, or a propyl group, and carbon atoms of the benzene ring may be replaced to form a heterocyclic ring; Z$^1$ represents COO, OCO, O, or direct bonding between A$^1$ and A$^2$ or between A$^2$ and A$^2$; and n represents 0, 1, or 2).

In the second embodiment, as a monomer 42 to form the polymer layers, the bifunctional monomer 42b represented by the foregoing chemical formula (2) is used in addition to the monofunctional monomer 42a represented by the foregoing chemical formula (1). The molar ratio of the bifunctional monomer 42b represented by the chemical formula (2) to the monofunctional monomer represented by the chemical formula (1) is 0.1 or less.

As illustrated in FIG. 4, a liquid crystal composition containing the monomer 42 is filled between the substrates 11 and 21. Then, as illustrated in FIG. 5, annealing treatment is performed at a predetermined temperature for a predetermined period of time. Subsequently, polymerization as illustrated in FIG. 6 is performed by irradiation with predetermined light from the normal direction. Electrodes each may be formed of a flat plate without a slit or with slits in a plurality of regions.

The polymerization of the monomer is initiated in the polymerization step illustrated in FIG. 6 to form polymer layers 43 on the surfaces of the silane coupling layers 12 and 22 provided on the first electrode and the second electrode. In the second embodiment, the polymerization step is performed by the annealing step of heating the entire liquid crystal cell and the light irradiation step of irradiating the liquid crystal layer with ultraviolet rays (UV). The polymerization reaction of the monomer 42 is initiated by, for example, irradiating the monomer with light or by the effect of an active species formed by irradiating the polymerization initiator with light.

In the method according to the second embodiment, the polymer layers 43 have improved bonding strength owing to a crosslinked structure derived from the bifunctional monomer, thus providing a more stable vertical alignment regulating force.

EXAMPLE 2

Another example of the actual production of a liquid crystal display device according to the second embodiment will be described below.

A pair of substrates including a first substrate and a second substrate was prepared. A dilute aqueous solution containing a silane coupling compound was applied onto a surface of each of the substrates. The concentration of the silane coupling compound in the dilute aqueous solution was in the range of 0.001% to 1.0% by weight with respect to a silane coupling agent as a whole. A rinsing (cleaning with deionized water) step after the treatment with the silane coupling agent was not performed.

Subsequently, a sealing agent was applied to a predetermined position of the first substrate. Beads were dispersed on the second substrate. The first substrate and the second substrate were bonded together. A liquid crystal material having negative dielectric anisotropy was filled between the pair of substrates to form a liquid crystal layer. A monofunctional monomer represented by the following chemical formula (4):

[Chem. 8]

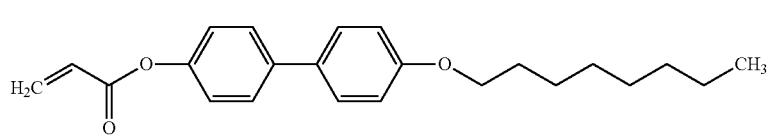

(4)

was introduced into the liquid crystal layer in a concentration of 4.5% by weight with respect to the overall liquid crystal composition, and a bifunctional monomer represented by the following chemical formula (5):

[Chem. 9]

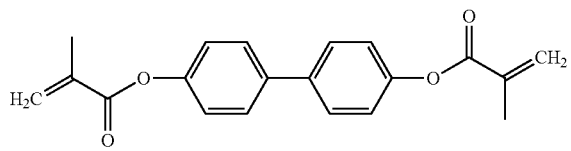

(5)

was introduced into the liquid crystal layer in such a manner that the molar ratio of the monofunctional monomer to the bifunctional monomer was 20:1.

The bifunctional monomer represented by the chemical formula (5) is 4-4'-dimethacryloxybiphenyl. A functional group, an alkyl group, or an alkoxy group is bound to the 4-4' positions of the biphenyl. The addition of the bifunctional monomer improves the crosslink density of the polymer layers which are formed from the monofunctional monomer and which are located at boundaries of the substrates after the polymerization, thereby resulting in the polymer layers each having a stronger vertical alignment regulating force.

After the filling of the liquid crystal, annealing treatment was performed at 130° C. for 1 hour. Subsequently, polymerization was performed by irradiation with unpolarized UV light (0.33 mW/cm$^2$) from the normal direction for 10 minutes (0.2 J/cm$^2$). As electrodes, flat-shaped electrodes without a slit were used.

Third Embodiment

Figure 7:
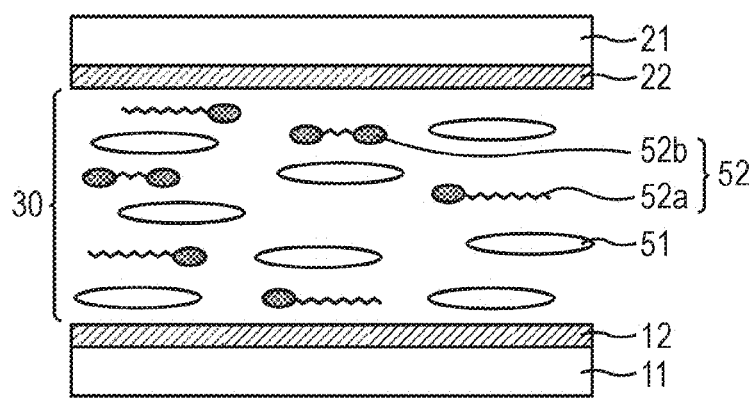
FIG. 7 is a schematic cross-sectional view illustrating a stage in the production process of the liquid crystal display device according to a third embodiment and illustrates a state after a step of filling a liquid crystal.
Figure 8:
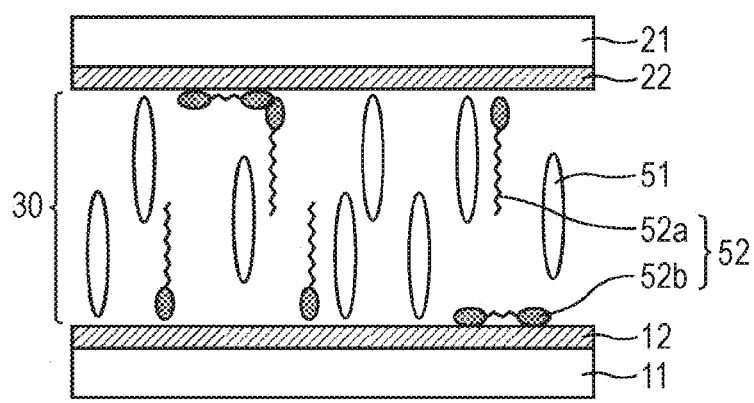
FIG. 8 is a schematic cross-sectional view illustrating a stage in the production process of the liquid crystal display device according to the third embodiment and illustrates a state after an annealing step.
Figure 9:
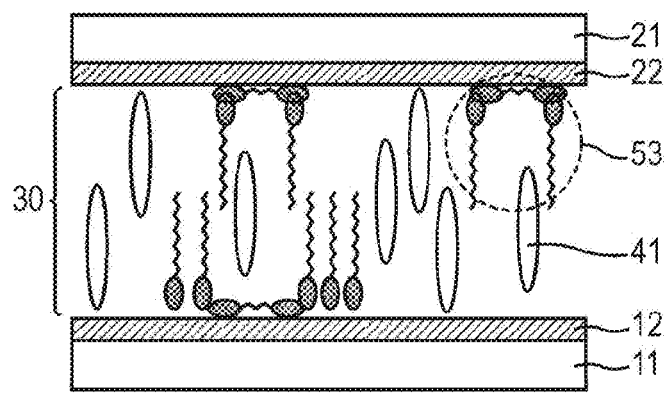
FIG. 9 is a schematic cross-sectional view illustrating a stage in the production process of the liquid crystal display device according to the third embodiment and illustrates a state after an ultraviolet irradiation step.

A third embodiment differs from the second embodiment in that a bifunctional monomer that generates a radical by irradiation with light having a wavelength of 330 nm or more is used as the monomeric material contained in the liquid crystal composition. The rest of the third embodiment is the same as in the second embodiment. FIGS. 7 to 9 are schematic cross-sectional views illustrating stages in the production process of a liquid crystal display device according to the third embodiment. FIG. 7 illustrates a state after a step of filling a liquid crystal. FIG. 8 illustrates a state after an annealing step. FIG. 9 illustrates a state after an ultraviolet irradiation step.

In the third embodiment, as a monomer 52 to form the polymer layers, a bifunctional monomer 52b represented by the foregoing chemical formula (2) is used in addition to a monofunctional monomer 52a represented by the foregoing chemical formula (1). The molar ratio of the bifunctional monomer 52b represented by the chemical formula (2) to the monofunctional monomer represented by the chemical formula (1) is 0.1 or less.

As illustrated in FIG. 7, a liquid crystal composition containing the monomer 52 is filled between the substrates 11 and 21. Then, as illustrated in FIG. 8, annealing treatment is performed at a predetermined temperature for a predetermined period of time. Subsequently, polymerization as illustrated in FIG. 9 is performed by irradiation with predetermined light from the normal direction. Electrodes each may be formed of a flat plate without a slit or with slits in a plurality of regions.

The polymerization of the monomer is initiated in the polymerization step illustrated in FIG. 9 to form polymer layers 53 on the surfaces of the silane coupling layers 12 and 22 provided on the first electrode and the second electrode. In the third embodiment, the polymerization step is performed by the annealing step of heating the entire liquid crystal cell and the light irradiation step of irradiating the liquid crystal layer with light having a wavelength of 330 nm or more. In the case of the monofunctional monomer 52a alone, polymerization does not occur only by light having a wavelength of 330 nm or more. By the incorporation of the bifunctional monomer 52b which has a phenanthrene skeleton and which generates a radical by light having a wavelength of 330 nm or more, the radical generated from the bifunctional monomer 52b by light having a wavelength of 330 nm or more attacks a polymerizable group of the monofunctional monomer 52a; hence, the polymerization of the monofunctional monomer 52a also proceeds. It is thus possible to form the polymer layers 53 having high vertical alignment performance while inhibiting the degradation of the liquid crystal display device without the use of light having a wavelength of 330 nm or less.

EXAMPLE 3

Another example of the actual production of a liquid crystal display device according to the third embodiment will be described below.

A pair of substrates including a first substrate and a second substrate was prepared. A dilute aqueous solution containing a silane coupling compound was applied onto a surface of each of the substrates. The concentration of the silane coupling compound in the dilute aqueous solution was in the range of 0.001% to 1.0% by weight with respect to a silane coupling agent as a whole. A rinsing (cleaning with deionized water) step after the treatment with the silane coupling agent was not performed.

Subsequently, a sealing agent was applied to a predetermined position of the first substrate. Beads were dispersed on the second substrate. The first substrate and the second substrate were bonded together. A liquid crystal material having negative dielectric anisotropy was filled between the pair of substrates to form a liquid crystal layer. A monofunctional monomer represented by the following chemical formula (4):

[Chem. 10]

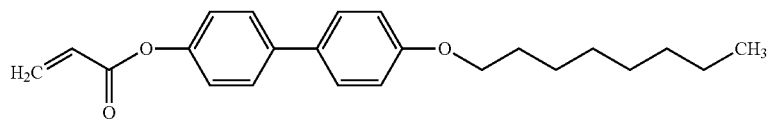

(4)

was introduced into the liquid crystal layer in a concentration of 4.5% by weight with respect to the overall liquid crystal composition, and a bifunctional monomer represented by the following chemical formula (6):

[Chem. 11]

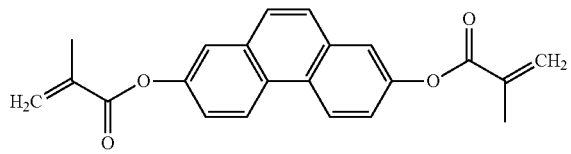

(6)

was introduced into the liquid crystal layer in such a manner that the molar ratio of the monofunctional monomer to the bifunctional monomer was 20:1.

The bifunctional monomer represented by the chemical formula (6) is 2-7-dimethacryloxyphenanthrene. A functional group, an alkyl group, or an alkoxy group is bound to the 4-4' positions of the phenanthrene. It is possible to improve the crosslink density of the polymer layers which are formed from the monofunctional monomer and which are located at boundaries of the substrates after the polymerization, thereby resulting in the polymer layers each having a stronger vertical alignment regulating force.

After the filling of the liquid crystal, annealing treatment was performed at 130° C. for 1 hour. Subsequently, polymerization was performed by irradiation with unpolarized UV light (0.33 mW/cm$^2$, wavelength: 365 nm) from the normal direction for 10 minutes (0.2 J/cm$^2$). As electrodes, flat-shaped electrodes without a slit were used. As described above, the use of light having a wavelength of 330 nm or more reduces the possibility of the occurrence of the degradation of the component members (for example, the liquid crystal layer) of the liquid crystal display device and the occurrence of defects, such as image persistence.

Figure 10:
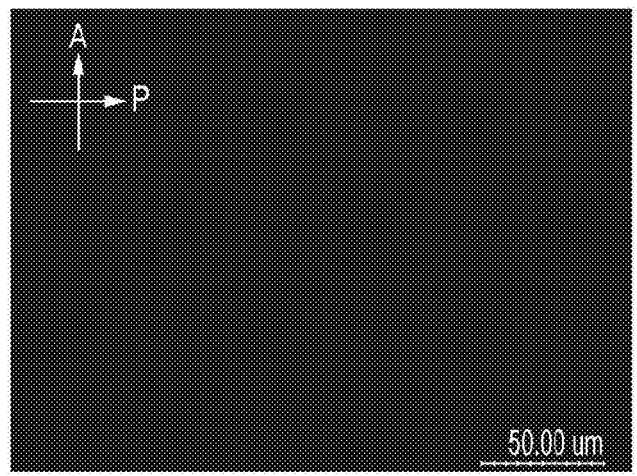
FIG. 10 is a photograph of a black screen of a liquid crystal display device formed by a technique for forming a polymer layer in Examples 1 to 3.
Figure 20:
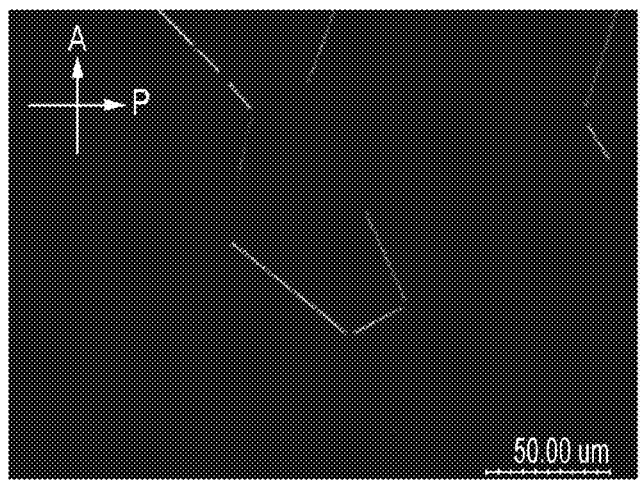
FIG. 20 is a photograph illustrating a black screen of a liquid crystal display device produced by a conventional technique for forming a polymer layer and illustrates an example in which lauryl acrylate is used as a monomeric material.
Figure 21:
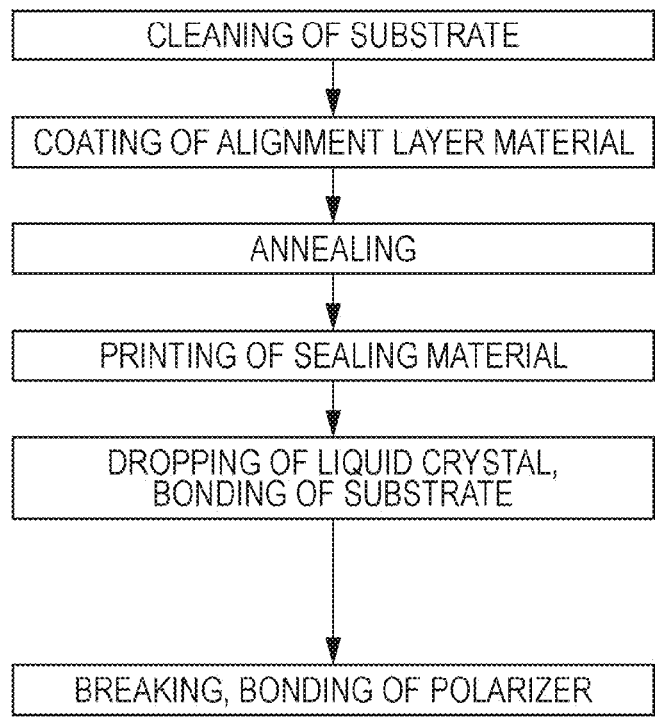
FIG. 21 is a flow chart illustrating an example of a conventional production process of a liquid crystal display device.
Figure 22:
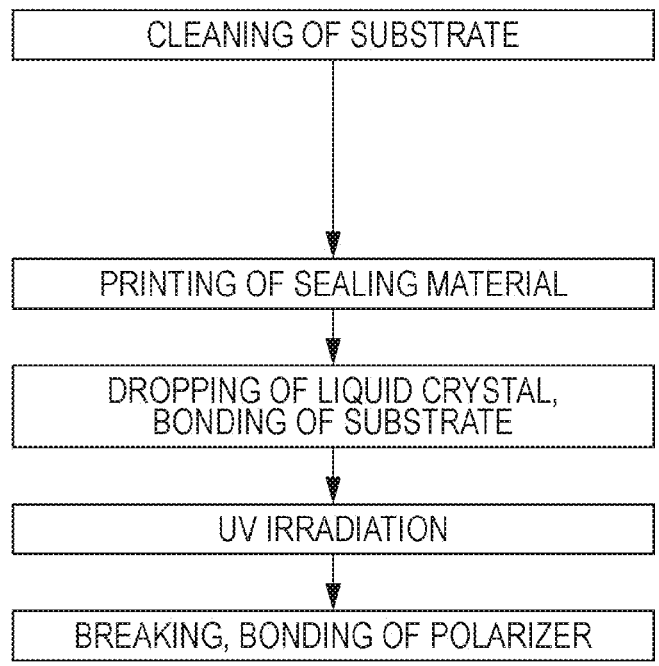
FIG. 22 is a flow chart illustrating an example of the production process of a liquid crystal display device of the present invention.

Properties of the resulting liquid crystal display panels according to Examples 1 to 3 were checked. FIG. 10 is a photograph of a black screen of the liquid crystal display devices formed by the techniques for forming polymer layers according to Examples 1 to 3. The photograph in FIG. 10 is taken with a polarizing microscope that is set in such a manner that the polarization axes intersect to each other at 90° without attaching a polarizer. FIG. 10 reveals that in Examples 1 to 3, no bright spot or bright line is observed in the black display and that satisfactory display is provided. This indicates that even in the case where an alignment layer is not formed, significantly satisfactory vertical alignment properties for liquid crystal molecules are provided by the technique for forming a polymer layer according to the present invention. In contrast, some bright lines are observed in the photograph illustrated in FIG. 20, as described above. Comparisons between them reveals that Examples 1 to 3 illustrated in FIG. 10 are superior.

In each of the techniques for forming a polymer layer in Examples 1 to 3, the nonvolatile monomeric material is used, unlike lauryl acrylate. Thus, in the case where the liquid crystal composition is filled between the pair of substrates, volatilization does not occur even in a vacuum state; hence, production equipment is not contaminated. Furthermore, treatment of the silane coupling agent can be included in a cleaning step of the current process. Thus, there is no need to install additional production equipment. That is, the techniques are also efficient as a production method.

For example, in a conventional monomeric material, such as lauryl acrylate, the flexibility of a structure between a functional group and a benzene ring is high. Thus, the stability of alignment is low, thereby leading to line defects to form the bright lines in black display. In contrast, in each of the monomeric materials according to the first to third embodiments, a structure in which the biphenyl group is directly bound to the functional group contributes to alignment stability. The bond in which two benzene rings are linked together has a non-flexible linear structure. The functional groups are directly bound to the benzene rings. Thus, a moiety extending from the functional groups to the biphenyl group has a stable structure, thereby eliminating the occurrence of a bright line in black display.

In each of the first to third embodiments, vertical alignment is achieved by filling the liquid crystal material containing the photopolymerizable monomeric material and then performing irradiation with UV light, in place of a process including the formation of an alignment layer by coating, and annealing at a high temperature (about 200° C.), the process having been required to produce a liquid crystal display. In this case, if the monomeric material added to the liquid crystal interacts weakly with the liquid crystal, the vertical alignment performance is low. Thus, a bright line is observed under crossed Nicols, reducing contrast. If the monomeric material interacts strongly with, vertical alignment is not achieved even by irradiation with UV light. Accordingly, the surfaces of the substrates are subjected to the treatment with the silane coupling agent, and annealing is performed after the filling of the liquid crystal, thereby directing the monomeric material to the direction perpendicular to the surfaces of the substrates. Furthermore, as described in each of the second and third embodiments, with respect to the monomeric material added to the liquid crystal, the bifunctional monomer is added to the monofunctional monomer that exhibits vertical alignment properties in order to increase the crosslink density of the polymer layers located at the boundaries of the substrates after polymerization, thereby providing higher vertical alignment performance.

COMPARATIVE EXAMPLE 1

Figure 11:
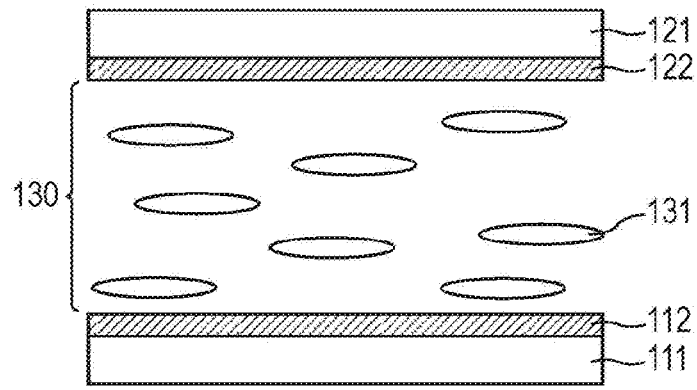
FIG. 11 is a schematic cross-sectional view illustrating a stage in the production process of a liquid crystal display panel according to Comparative Example 1 and illustrates a state after a step of filling a liquid crystal.
Figure 12:
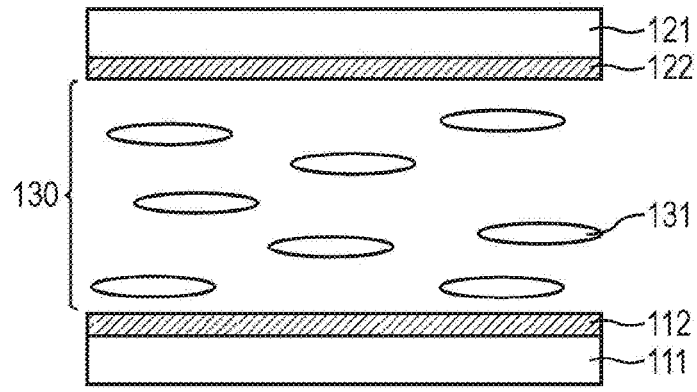
FIG. 12 is a schematic cross-sectional view illustrating a stage in the production process of the liquid crystal display panel according to Comparative Example 1 and illustrates a state after an annealing step.

To verify the improvement effect on the liquid crystal display panel in Example 1, a liquid crystal display panel according to Comparative Example 1 was prepared, and a comparative study was conducted. FIGS. 11 and 12 are schematic cross-sectional views illustrating stages in the production process of the liquid crystal display panel according to Comparative Example 1. FIG. 11 illustrates a state after a step of filling a liquid crystal. FIG. 12 illustrates a state after an annealing step. The liquid crystal display panel according to Comparative Example 1 was produced as in Example 1, except that no monomeric material was added to the liquid crystal composition.

As illustrated in FIG. 11, surfaces of two substrates 111 and 121 each having a flat-shaped electrode were cleaned. Then a silane coupling agent was applied to each of the surfaces. Next, a sealing material was applied to one of the substrates. Beads were dispersed on the other substrate. The resulting substrates were bonded together. A liquid crystal having negative dielectric anisotropy was filled. In Comparative Example 1, a monofunctional monomer was not added to the liquid crystal composition. After the filling of the liquid crystal, annealing treatment was performed at 130° C. for 1 hour, as illustrated in FIG. 12. As illustrated in FIGS. 11 and 12, the properties of the liquid crystal cell were not significantly changed before and after the annealing.

Figure 13:
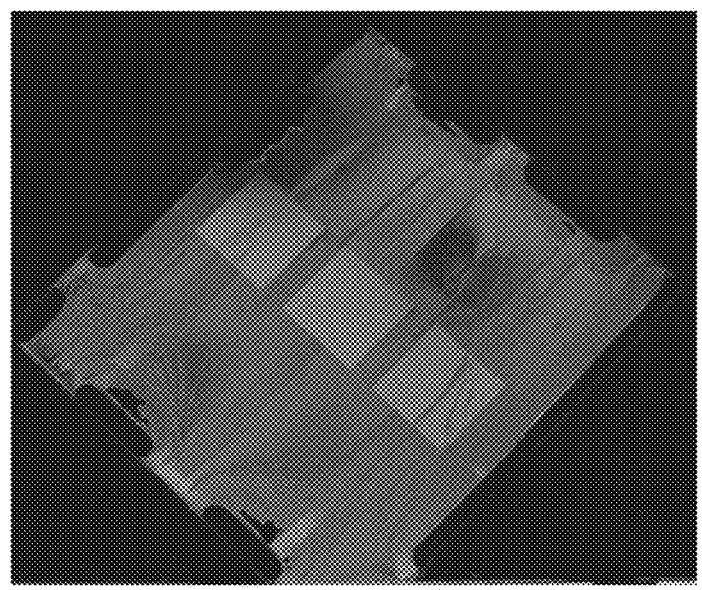
FIG. 13 is a photograph of a state of a panel under crossed Nicols after annealing and illustrates the liquid crystal display panel in Comparative Example 1.
Figure 14:
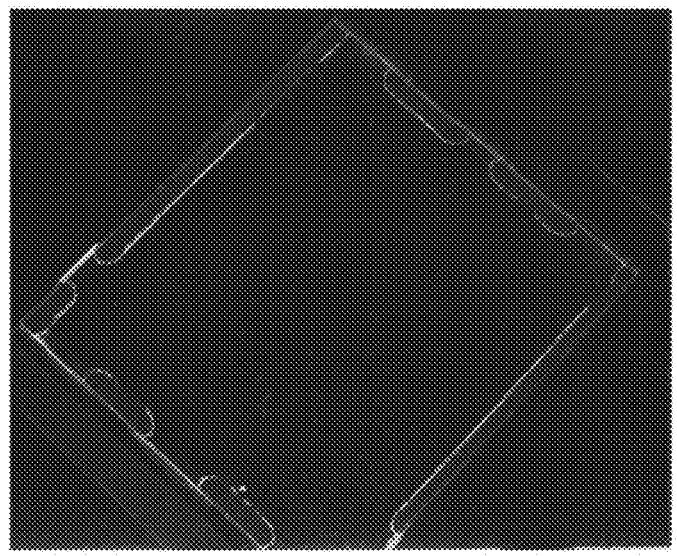
FIG. 14 is a photograph of a state of a panel under crossed Nicols after annealing and illustrates a liquid crystal display panel in Example 1.

FIGS. 13 and 14 are photographs states of the panels under crossed Nicols after the annealing. FIG. 13 illustrates the liquid crystal display panel in Comparative Example 1. FIG. 14 illustrates the liquid crystal display panel in Example 1. As is clear from FIG. 13, in the panel according to Comparative Example 1, black display is not achieved, and the liquid crystal molecules are not vertically aligned. In contrast, as is clear from FIG. 14, in the panel according to Example 1, black display is achieved, and the liquid crystal molecules are vertically aligned. The results demonstrated that in the case where a monomeric material was not added to the liquid crystal composition and where the silane coupling layers were just formed, the liquid crystal molecules were not vertically aligned after annealing. It was thus found that the effect of achieving vertical alignment was satisfactorily provided only by the combination of the silane coupling agent and the technique for aligning a polymer.

COMPARATIVE EXAMPLE 2

Figure 15:
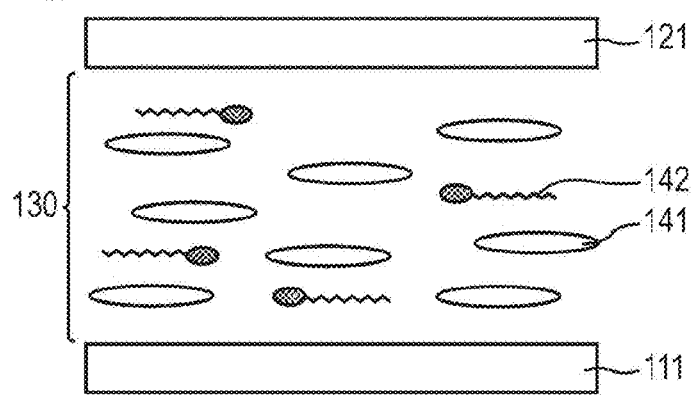
FIG. 15 is a schematic cross-sectional view illustrating a stage in the production process of a liquid crystal display device according to Comparative Example 2 and illustrates a state after a step of filling a liquid crystal.
Figure 16:
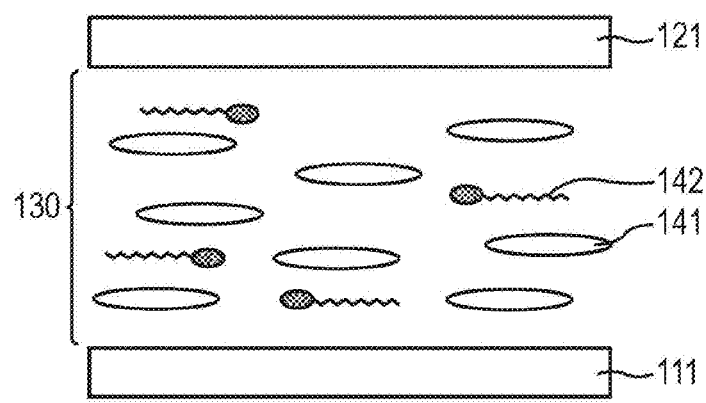
FIG. 16 is a schematic cross-sectional view illustrating a stage in the production process of the liquid crystal display device according to Comparative Example 2 and illustrates a state after an annealing step.
Figure 17:
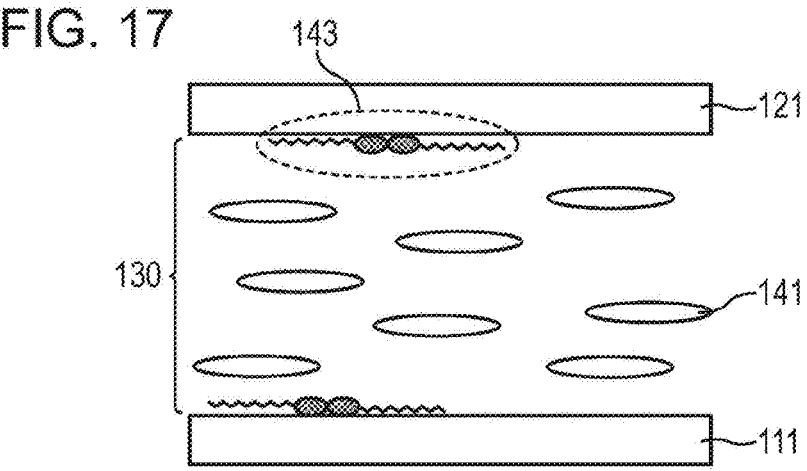
FIG. 17 is a schematic cross-sectional view illustrating a stage in the production process of the liquid crystal display device according to Comparative Example 2 and illustrates a state after an ultraviolet irradiation step.

To verify the improvement effect on the liquid crystal display panel in Example 1, a liquid crystal display panel according to Comparative Example 2 was prepared, and a comparative study was conducted. FIGS. 15 to 17 are schematic cross-sectional views illustrating stages in the production process of the liquid crystal display panel according to Comparative Example 2. FIG. 15 illustrates a state after a step of filling a liquid crystal. FIG. 16 illustrates a state after an annealing step. FIG. 17 illustrates a state after an ultraviolet irradiation step. The liquid crystal display panel according to Comparative Example 2 was produced as in Example 1, except that the treatment with the silane coupling agent was not performed on the surfaces of the substrates.

As illustrated in FIG. 15, surfaces of two substrates 111 and 121 each having a flat-shaped electrode were cleaned. Then a sealing material was applied to one of the substrates. Beads were dispersed on the other substrate. The resulting substrates were bonded together. A liquid crystal having negative dielectric anisotropy was filled. In Comparative Example 2, a monofunctional monomer (4-acryloxy-4'-octylbiphenyl) was introduced into the liquid crystal composition in a concentration of 4.5% by weight with respect to the overall liquid crystal composition. After the filling of the liquid crystal, annealing treatment was performed at 130° C. for 1 hour, as illustrated in FIG. 16. As illustrated in FIGS. 15 and 16, the properties of the liquid crystal cell were not significantly changed before and after the annealing. Furthermore, as illustrated in FIG. 17, the liquid crystal cell was subjected to UV irradiation to polymerize the monofunctional monomer, thereby forming polymer layers.

Figure 18:
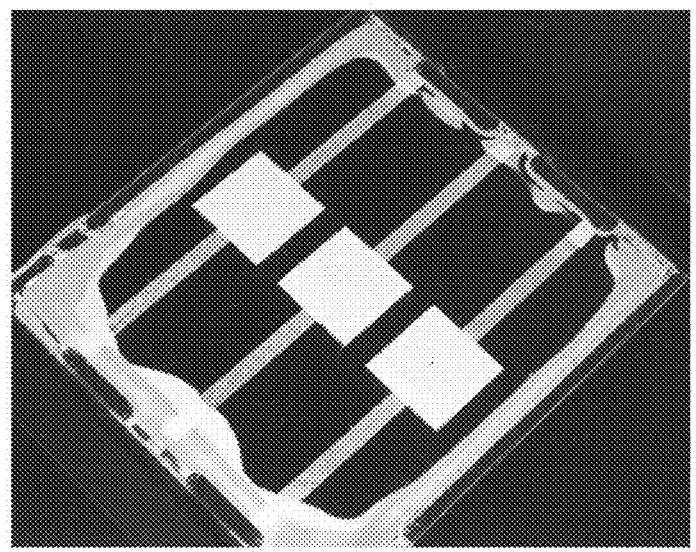
FIG. 18 is a photograph of a state of a panel under crossed Nicols after annealing and illustrates the liquid crystal display panel in Comparative Example 2.
Figure 19:
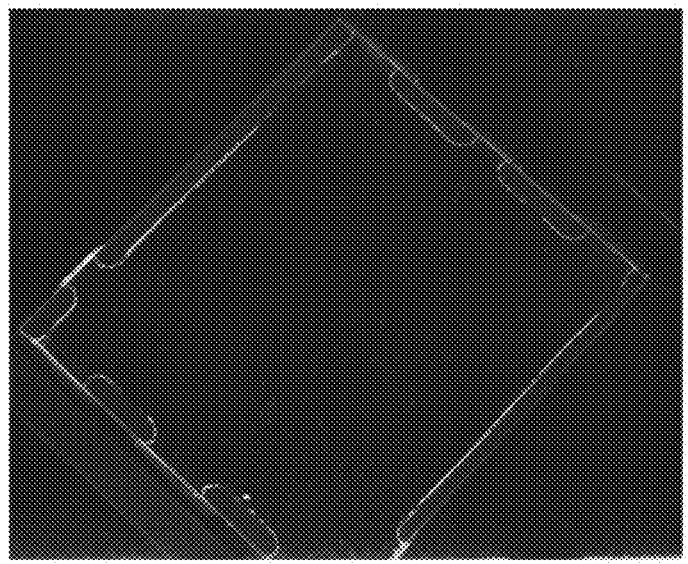
FIG. 19 is a photograph of a state of a panel under crossed Nicols after annealing and illustrates a liquid crystal display panel in Example 1.

FIGS. 18 and 19 are photographs of states of the panels under crossed Nicols after the annealing. FIG. 18 illustrates the liquid crystal display panel in Comparative Example 2. FIG. 19 illustrates the liquid crystal display panel in Example 1. As is clear from FIG. 18, in the panel according to Comparative Example 2, black display is not achieved, and the liquid crystal molecules are not vertically aligned. In contrast, as is clear from FIG. 19, in the panel according to Example 1, black display is achieved, and the liquid crystal molecules are vertically aligned. The results demonstrated that in the case where a silane coupling layer was not formed and where the monomeric material was just added to the liquid crystal composition, the liquid crystal molecules were not vertically aligned. It was thus found that the effect of achieving vertical alignment was satisfactorily provided only by the combination of the silane coupling agent and the technique for aligning a polymer.

Each of the liquid crystal display devices according to the first to third embodiments may be used in various modes in which an alignment control structure capable of tilting liquid crystal molecules to a predetermined direction relative to the substrate surfaces when a voltage is applied and/or when no voltage is applied is arranged, on the premise that an existing alignment layer is not substantially provided. Specifically, the liquid crystal display devices may be used in, for example, a multi-domain vertical alignment (MVA) mode that controls the alignment of liquid crystal molecules by arranging a wall-like (linear when viewed in plan) dielectric protrusion (rib) provided as an alignment-controlling protrusion on an electrode so as to protrude toward the liquid crystal layer, and a slit in the electrode; a patterned vertical alignment (PVA) mode that controls the alignment of liquid crystal molecules by arranging slits, serving as an alignment-controlling protrusion, in electrodes of both substrates; and a continuous pinwheel alignment (CPA) mode that controls the alignment of liquid crystal molecules by arranging a columnar-shaped (dot-shaped, when viewed in plan) structure (rivet), serving as an alignment-controlling protrusion, or an opening (hole) on an electrode. The arrangement of these structures enables the alignment of liquid crystal molecules to be stabilized, thereby reducing the possibility of a display defect.

This application claims the benefit of Japanese Patent Application No. 2011-026250 filed Feb. 9, 2011 under the Paris Convention and provisions of national law in a designated State, the entire contents of which are hereby incorporated by reference.

REFERENCE SIGNS LIST 11, 111 first substrate
12, 22, 112, 122 silane coupling layer
21, 121 second substrate
30, 130 liquid crystal layer
31, 41, 51, 131, 141 liquid crystal molecules
42, 52, 142 monomer
32, 42a, 52a monofunctional monomer
42b, 52b bifunctional monomer
33, 43, 53, 143 polymer layer

The invention claimed is:

1. A liquid crystal display device comprising a pair of substrates and a liquid crystal layer held between the pair of substrates, at least one of the substrates including an electrode, and the liquid crystal layer having negative dielectric anisotropy,
   wherein each of the pair of substrates includes a silane coupling layer on a surface of the corresponding substrate,
   a polymer layer configured to vertically align adjacent liquid crystal molecules is formed on a surface of the silane coupling layer,
   the polymer layer is formed by the polymerization of at least two monomers contained in a liquid crystal composition, and
   the at least two monomers contain a monofunctional monomer represented by the chemical formula (1):

[Chem. 1]

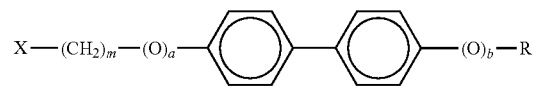

(1)

wherein in the formula (1), X represents an acrylate group, a methacrylate group, an ethacrylate group, a vinyl group, or an allyl group; m represents an integer of 0 to 4; a represents 0 or 1; b represents 0 or 1; and R represents an alkyl group having 1 to 20 carbon atoms, and
a bifunctional monomer represented by the chemical formula (2):

(2)

wherein in the formula (2), $P^1$ and $P^2$ are the same or different and each represent an acrylate group, a methacrylate group, a vinyl group, a vinyloxy group, or an epoxy group; $A^1$ and $A^2$ each represent a phenanthrene-2,7-diyl group; a hydrogen group may be replaced with a halogen group, a methyl group, an ethyl group, or a propyl group, and carbon atoms of the benzene ring may be replaced to form a heterocyclic ring; $Z^1$ represents COO, OCO, O, or direct bonding between $A^1$ and $A^2$ or between $A^2$ and $A^2$; and n represents 0, 1, or 2.

2. The liquid crystal display device according to claim 1, wherein the silane coupling layer contains a silane coupling compound having at least one functional group selected from the group consisting of an epoxy group, a methacryloxy group, an acryloxy group, an amino group, a ureido group, a chloropropyl group, a mercapto group, and an isocyanate group.

3. The liquid crystal display device according to claim 1, wherein the liquid crystal composition contains a polymerization initiator.

4. The liquid crystal display device according to claim 1, wherein the at least two monomers contain a monomer that generates a radical by irradiation with light having a wavelength of 330 nm or more.

5. A method for producing a liquid crystal display device that includes a pair of substrates and a liquid crystal layer held between the pair of substrates, at least one of the substrates including an electrode, and the liquid crystal layer having negative dielectric anisotropy, the method comprising, in sequence:
   a step of applying a silane coupling agent to a surface of each of the pair of substrates, thereby forming a silane coupling layer on the surface of each of the pair of substrates;
   a step of filling a liquid crystal composition having negative dielectric anisotropy between the pair of substrates, the liquid crystal composition containing liquid crystal molecules and at least two monomers;
   a step of annealing the pair of substrates and the liquid crystal composition; and
   a step of irradiating the liquid crystal composition with light, thereby polymerizing the at least two monomers to form a polymer layer on a surface of the silane coupling layer, the polymer layer being configured to vertically align adjacent liquid crystal molecules,
   wherein the at least two monomers contain a monofunctional monomer represented by the chemical formula (1):

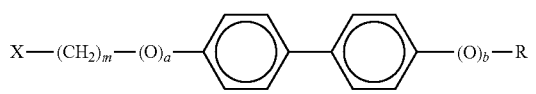

(1)

wherein in the formula (1), X represents an acrylate group, a methacrylate group, an ethacrylate group, a vinyl group, or an allyl group; m represents an integer of 0 to 4; a represents 0 or 1; b represents 0 or 1; and R represents an alkyl group having 1 to 20 carbon atoms, and
a bifunctional monomer represented by the chemical formula (2):

$$P^1\text{-}A^1\text{-}(Z^1\text{-}A^2)_n\text{-}P^2 \qquad (2)$$

wherein in the formula (2), $P^1$ and $P^2$ are the same or different and each represent an acrylate group, a methacrylate group, a vinyl group, a vinyloxy group, or an epoxy group; $A^1$ and $A^2$ each represent a phenanthrene-2,7-diyl group; a hydrogen group may be replaced with a halogen group, a methyl group, an ethyl group, or a propyl group, and carbon atoms of the benzene ring may be replaced to form a heterocyclic ring; $Z^1$ represents COO, OCO, O, or direct bonding between $A^1$ and $A^2$ or between $A^2$ and $A^2$; and n represents 0, 1, or 2.

6. The method for producing a liquid crystal display device according to claim 5, wherein the silane coupling agent contains a silane coupling compound having at least one functional group selected from the group consisting of an epoxy group, a methacryloxy group, an acryloxy group, an amino group, a ureido group, a chloropropyl group, a mercapto group, and an isocyanate group.

7. The method for producing a liquid crystal display device according to claim 5, wherein the concentration of the silane coupling compound in the silane coupling agent is in the range of 0.001% to 1.0% by weight with respect to the silane coupling agent as a whole.

8. The method for producing a liquid crystal display device according to claim 5, wherein the liquid crystal layer includes a polymerization initiator.

9. The method for producing a liquid crystal display device according to claim 5, wherein the at least two monomers contain a monomer that generates a radical by irradiation with light having a wavelength of 330 nm or more.

* * * * *